(12) United States Patent
Kitazato

(10) Patent No.: US 10,582,244 B2
(45) Date of Patent: Mar. 3, 2020

(54) FEEDING DEVICE, FEEDING METHOD, RECEIVING DEVICE, RECEIVING METHOD, PROGRAM, AND BROADCASTING SYSTEM

(75) Inventor: Naohisa Kitazato, Tokyo (JP)

(73) Assignee: Saturn Licensing LLC, New York, NY (US)

( * ) Notice: Subject to any disclaimer, the term of this patent is extended or adjusted under 35 U.S.C. 154(b) by 0 days.

(21) Appl. No.: 14/111,286

(22) PCT Filed: Apr. 11, 2012

(86) PCT No.: PCT/JP2012/059839
§ 371 (c)(1),
(2), (4) Date: Oct. 11, 2013

(87) PCT Pub. No.: WO2012/144379
PCT Pub. Date: Oct. 26, 2012

(65) Prior Publication Data
US 2014/0109133 A1    Apr. 17, 2014

(30) Foreign Application Priority Data
Apr. 21, 2011 (JP) ................................. 2011-094939

(51) Int. Cl.
*H04N 21/242* (2011.01)
*H04N 21/422* (2011.01)
(Continued)

(52) U.S. Cl.
CPC ....... *H04N 21/262* (2013.01); *H04N 21/4126* (2013.01); *H04N 21/4307* (2013.01);
(Continued)

(58) Field of Classification Search
None
See application file for complete search history.

(56) References Cited

U.S. PATENT DOCUMENTS

2001/0052133 A1    12/2001   Pack et al.
2003/0131357 A1     7/2003   Kim
(Continued)

FOREIGN PATENT DOCUMENTS

CN        1241405 C      2/2006
CN      101390394 A      3/2009
(Continued)

OTHER PUBLICATIONS

International Search Report dated May 29, 2012, in PCT/JP2012/059839.
(Continued)

*Primary Examiner* — Brian T Pendleton
*Assistant Examiner* — Jean D Saint Cyr
(74) *Attorney, Agent, or Firm* — Oblon, McClelland, Maier & Neustadt, L.L.P.

(57) ABSTRACT

In a broadcasting system of the present disclosure, a feeding device includes a broadcasting unit that broadcasts a program to a receiving device via a broadcasting network, and a feeding unit that feeds a segment data sequence containing at least one piece of segment data including a segment validity period indicating a synchronization period for progress of the program and metadata associated with the program in progress to the receiving device, and the receiving device includes a receiving unit that receives the program broadcast from the feeding device via the broadcasting network, an acquisition unit that acquires the segment data sequence fed from the feeding device, and a presentation unit that presents information about the program to a user in synchronization with the progress of the program based on the acquired segment data sequence.

18 Claims, 25 Drawing Sheets

(51) Int. Cl.
*H04N 21/43* (2011.01)
*H04N 21/434* (2011.01)
*H04N 21/4402* (2011.01)
*H04N 21/845* (2011.01)
*H04N 21/262* (2011.01)
*H04N 21/41* (2011.01)
*H04N 21/462* (2011.01)
*H04N 21/858* (2011.01)
*H04N 21/8547* (2011.01)
*H04N 21/4722* (2011.01)
*H04N 21/458* (2011.01)

(52) U.S. Cl.
CPC ....... *H04N 21/458* (2013.01); *H04N 21/4622* (2013.01); *H04N 21/4722* (2013.01); *H04N 21/8455* (2013.01); *H04N 21/8547* (2013.01); *H04N 21/8586* (2013.01)

(56) References Cited

U.S. PATENT DOCUMENTS

| | | | | |
|---|---|---|---|---|
| 2003/0231210 | A1* | 12/2003 | Anderson | G06F 9/451 715/767 |
| 2004/0098398 | A1 | 5/2004 | Ahn et al. | |
| 2004/0190779 | A1 | 9/2004 | Sarachik et al. | |
| 2006/0069883 | A1* | 3/2006 | Shimizu | G06F 17/30587 711/154 |
| 2006/0215984 | A1 | 9/2006 | Nesvadba et al. | |
| 2007/0283402 | A1* | 12/2007 | Yu | H04H 20/93 725/114 |
| 2009/0022476 | A1* | 1/2009 | Nonoyama | H04H 20/93 386/278 |
| 2009/0129749 | A1* | 5/2009 | Oyamatsu | G11B 27/11 386/241 |
| 2010/0015999 | A1* | 1/2010 | Belz | G01S 5/0063 455/456.2 |
| 2010/0066751 | A1* | 3/2010 | Ryu | G06F 1/1626 345/581 |
| 2010/0121852 | A1* | 5/2010 | Kim | G06F 16/58 707/737 |
| 2010/0153999 | A1* | 6/2010 | Yates | 725/39 |
| 2013/0325927 | A1* | 12/2013 | Corbett | H04L 67/42 709/203 |

FOREIGN PATENT DOCUMENTS

| | | |
|---|---|---|
| CN | 100520945 C | 7/2009 |
| EP | 1 818 826 A1 | 8/2007 |
| EP | 1 973 294 A1 | 9/2008 |
| JP | 10-285460 A | 10/1998 |
| JP | 11-275537 A | 10/1999 |
| JP | 2001-251565 A | 9/2001 |
| JP | 2002-238036 A | 8/2002 |
| JP | 2002-320163 A | 10/2002 |
| JP | 2003-69514 A | 3/2003 |
| JP | 2003-283946 A | 10/2003 |
| JP | 2004-180136 A | 6/2004 |
| JP | 2004-534417 A | 11/2004 |
| JP | 2005-124163 A | 5/2005 |
| JP | A 2005-151147 | 6/2005 |
| JP | 2006-50237 A | 2/2006 |
| JP | 2006-523357 A | 10/2006 |
| WO | WO 01/06688 A1 | 1/2001 |
| WO | WO 02/061596 A1 | 8/2002 |
| WO | WO 2004/084214 A1 | 9/2004 |
| WO | WO 2006/049185 A1 | 5/2006 |
| WO | WO 2007/097387 A1 | 8/2007 |
| WO | 2009/024888 A1 | 2/2009 |
| WO | WO 2010/029743 A1 | 3/2010 |

OTHER PUBLICATIONS

Extended European Search Report dated Aug. 5, 2014, in European Patent Application No. 12774121.3.
Matthias Finke, et al., "A reference architecture supporting hypervideo content for ITV and the internet domain", Computers & Graphics, vol. 28, No. 2, XP-004492994, Apr. 1, 2004, pp. 179-191.
Japanese Office Action dated Jun. 14, 2016 in Patent Application No. 2013-510958 (with English language translation).
Japanese Office Action dated Oct. 18, 2016 in Application No. 2013-510958 (w/ translation), 14 pages.
Combined Chinese Office Action and Search Report dated Mar. 16, 2016, in Patent Application No. 201280018207.0 (Submitting English translation only).
Japanese Office Action dated Feb. 2, 2016 in Application No. 2013-510958 (with English translation).
Japanese Office Action dated Sep. 7, 2016 in Application No. 2013-510958.
European Office Action dated Oct. 22, 2015 in Patent Application No. 12 774 121.3.
Kazuo Okamura, et al., "IplusTV:A Data Broadcasting Mechanism using Time-Lined Hypermedia and its Implementation" Information Processing Society of Japan, vol. 40, No. 5, May 15, 1999, pp. 91-102 and cover pages (with English Abstract).
Haruo Hoshino, "Data Broadcasting of One-Segment Broadcasting and Communication Cooperation Services" NHK R&D Japan Broadcast Publishing, No. 96, Mar. 15, 2006, pp. 16-25 and cover pages.
Office Action issued in corresponding Japanese Application No. 2016-174724 dated Jan. 18, 2018 (drafted Jan. 16, 2018).
Decision to Refuse a European Patent Application issued in corresponding European Application No. 12 774 121.3 dated Oct. 25, 2018.
Decision to Dismiss Amendment dated Aug. 2, 2018 in Patent Application No. 2016-174724 (with English translation), 18 pages.
Decision of Rejection dated Aug. 2, 2018 in Patent Application No. 2016-174724 (with English translation), 8 pages.

\* cited by examiner

FIG. 7

DATA STRUCTURE OF SEGMENT DATA SEQUENCE

| ELEMENT (ATTRIBUTE) | | | APPEARANCE NUMBER | VALUE | DEFINITION AND DETAILED OPERATION |
|---|---|---|---|---|---|
| segment_sequence | | | 1 | | |
| | segment | | 1..N | | DATA SEGMENT |
| | | @segment_number | 1 | | SEGMENT NUMBER |
| | | start_PTS | 1 | | SEGMENT START PTS VALUE |
| | | End_PTS | 1 | | SEGMENT END PTS VALUE |
| | | command | 0..1 | | APPLICATION COMMAND |
| | | metadata | 0..1 | | METADATA |

FIG.8

| ELEMENT (ATTRIBUTE) | APPEARANCE NUMBER | DEFINITION AND DETAILED OPERATION |
|---|---|---|
| metadata | 1 | |
| @type | 1 | METADATA TYPE "application_data": APP DATA "caption": text SUBTITLE DATA "subtitle": BITMAP SUBTITLE DATA "meta": ASSOCIATED METADATA |
| @target | 0..1 | TARGET APPLICATION. SPECIFY BY APPLICATION ID TO BE TARGET. DO NOT ARRANGE WHEN Resident APP IS TARGETED. |
| ##defined structure | | DATA STRUCTURE FOR EACH TYPE |

FIG.9

| ELEMENT (ATTRIBUTE) | APPEARANCE NUMBER | DEFINITION AND DETAILED OPERATION |
|---|---|---|
| meta | 0..N | |
| @focus_type | 1 | "human", "thing", "location", "general" |
| @focus_name | 1 | TITLE NAME |
| explanation | 0..N | EXPLANATORY INFORMATION |
| link | 0..N | LINK INFORMATION |
| keyword | 0..N | KEYWORD |
| location | 0..N | POSITION INFORMATION |
| pointer | 0..N | POINTER POSITION ON SCREEN |

FIG. 10

| ELEMENT (ATTRIBUTE) | APPEARANCE NUMBER | DEFINITION AND DETAILED OPERATION |
|---|---|---|
| explanation | 0..N | |
| @title | 1 | EXPLANATORY TEXT |
| | 1 | EXPLANATION TITLE NAME |
| @type | 1 | EXPLANATORY TYPE SUCH AS "definition", "biography", "background", "relation", "access", and "introduction" |
| @logo | 0..1 | URL FROM WHICH LOGO IMAGE FOR EXPLANATION CAN BE ACQUIRED |

FIG. 11

| ELEMENT (ATTRIBUTE) | APPEARANCE NUMBER | DEFINITION AND DETAILED OPERATION |
|---|---|---|
| link | 0, N | |
| @title | 1 | LINK TITLE NAME |
| @type | 1 | LINK TYPE "info", "content" |
| @url | 1 | LINK DESTINATION URL |
| @logo | 0, 1 | LOGO IMAGE URL |

FIG.12

| ELEMENT (ATTRIBUTE) | APPEARANCE NUMBER | DEFINITION AND DETAILED OPERATION |
|---|---|---|
| Keyword | 0, N | CHARACTER STRING OF KEYWORD |

FIG. 13

| ELEMENT (ATTRIBUTE) | APPEARANCE NUMBER | DEFINITION AND DETAILED OPERATION |
|---|---|---|
| location | 0, N | |
| @title | 0, 1 | |
| @longitude | 0, N | LONGITUDE |
| @latitude | 0, N | LATITUDE |

FIG. 14

| ELEMENT (ATTRIBUTE) | APPEARANCE NUMBER | DEFINITION AND DETAILED OPERATION |
|---|---|---|
| pointer | 0, N | |
| @horizontal | 0, N | HORIZONTAL POINTER POSITION (NUMBER OF PIXELS) |
| @vertical | 0, N | VERTICAL POINTER POSITION (NUMBER OF PIXELS) |

FIG.22

```
<segment_sequence>
......
<segment segment_number="1">
<start_PTS> 12000 </start_PTS>
<end_PTS> 20000 </end_PTS>
<data type="meta">
<meta focus_type="location", title="OMURO CHAYA">
<explanation type="introduction" title="OMURO CHAYA">
...OMURO AND HIS COMPANIONS IN SHOP
</explanation>
<explanation type="introduction" title="GOODS">
......
</explanation>
<explanation type="introduction" title="ACCESS">
......
</explanation>
<link type="info", url="http://XXX, logo=http://XXX/"/>
<keyword> SHINDAMI </keyword>
<keyword> SHIGERU MIZUMOTO </keyword>
<location latitude="35.690", longitude="139.543"/>
</meta>
</data>
</segment>
......
</segment_sequence>
```

FIG. 24

```
<segment sequence>
 ・・・・・・・・・・・
 <segment segment_number="1">
  <start_PTS> 278320 </start_PTS>
  <end_PTS> 302340 </end_PTS>
  <data type="meta">
   <meta focus_type="human" title="SHIKI MASAOKA">
    <explanation type="biography" title="SHIKI MASAOKA">
     ・・・・・・・・・・・
    </explanation>
    <explanation type="biography" title="TERUYUKI KAYAMA">
     ・・・・・・・・・・・
    </explanation>
    <link type="info", url=http://XXX, title="STUDY OF SHIKI MASAOKA" />
    <link type="info", url=http://XXX, title="ROOM OF TERUYUKI KAYAMA" />
    <pointer horizontal="850", vertical="200" />
   </meta>
   <meta focus_type="human" title="MASAYUKI AKIYAMA">
    ・・・・・・・・・・・
   </meta>
  </data>
 </segment>
 ・・・・・・・・・・・
</segment sequence>
```

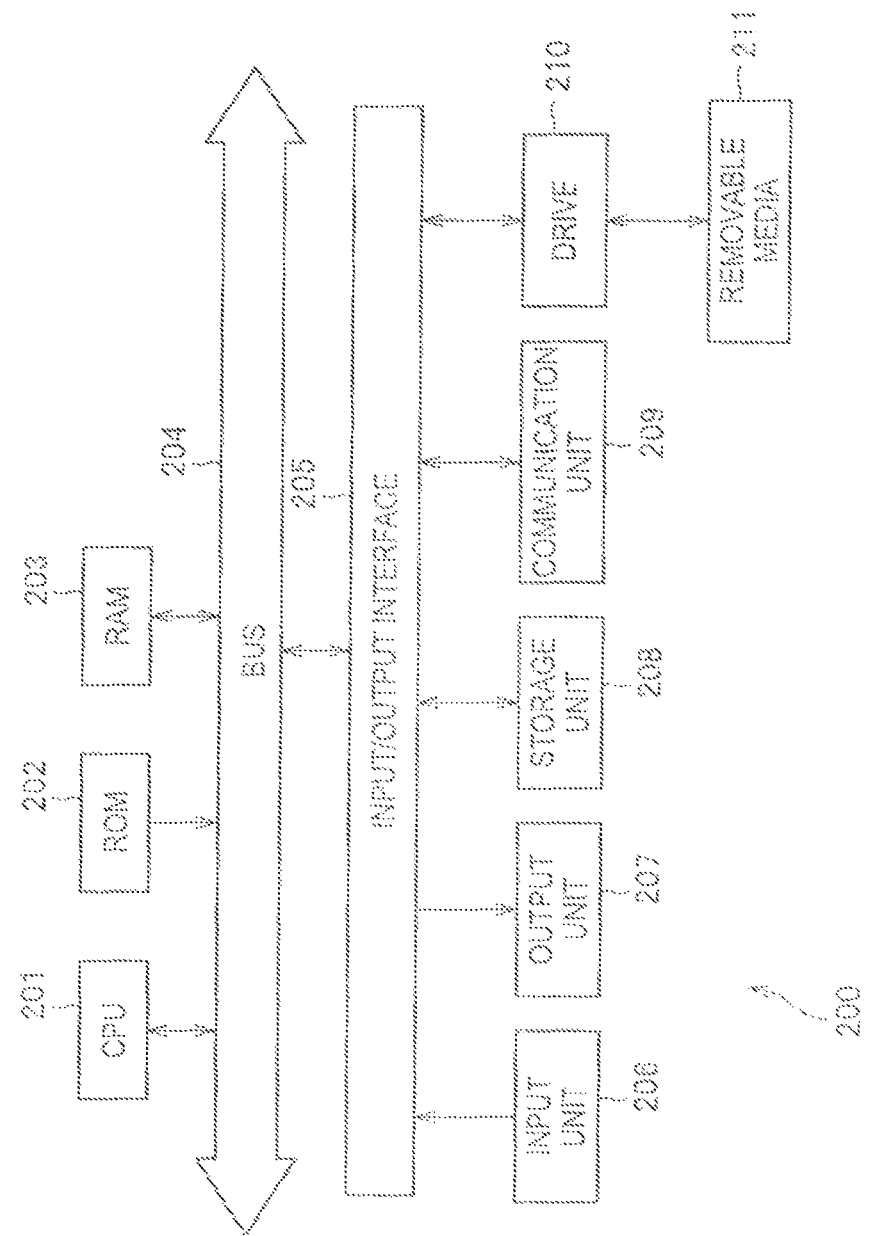

FEEDING DEVICE, FEEDING METHOD, RECEIVING DEVICE, RECEIVING METHOD, PROGRAM, AND BROADCASTING SYSTEM

TECHNICAL FIELD

The present disclosure relates to a feeding device, a feeding method, a receiving device, a receiving method, a program, and a broadcasting system, and in particular, relates to a feeding device suitable for use when data broadcasting synchronized with the progress of a program of digital television broadcasting is provided, a feeding method, a receiving device, a receiving method, a program, and a broadcasting system.

BACKGROUND ART

In digital television broadcasting, not only a broadcasting service of television programs, bus also a service called data broadcasting is realized (see, for example, Patent Literature 1).

Conventional data broadcasting is used, for example, to display information not directly related to a television program being viewed such as news, weather forecasts, and traffic information or to display information (casts, the story and so on) related to a television program being viewed.

Further, in conventional data broadcasting, displaying information (information about humans, things, shops or the like currently on the screen) synchronized with the progress of the television program being viewed is realized, though not frequently implemented.

Regarding data broadcasting in the future, a service (hereinafter, called a program progress synchronization information service) that displays information synchronized with the progress of the television program being viewed is demanded to be enriched (increased implementation frequency).

CITATION LIST

Patent Literature

Patent Literature 1: Japanese Patent Application Laid-Open No. 2006-50237

SUMMARY OF INVENTION

Technical Problem

As described above, a program progress synchronization information service can be realized by using the structure of conventional data broadcasting. However, for the realization of such a service, it is necessary to promote close cooperation between creation of a television program and creation of data for data broadcasting, which is very time-consuming work in terms of operation.

The present disclosure is developed in view of such circumstances and intended to easily enable realization of the program progress synchronization information service.

Solution to Problem

According to a first embodiment of the present disclosure, there is provided a feeding device including a broadcasting unit that broadcasts a program to a receiving device via a broadcasting network, and a feeding unit that feeds a segment data sequence containing at least one piece of segment data including a segment validity period indicating a synchronization period for progress of the program and metadata associated with the program in progress to the receiving device.

The feeding unit may feed the segment data sequence to the receiving device via a network in response to a request from the receiving device.

The broadcasting unit may also broadcast an application control descriptor containing a URL of the feeding unit serving as a feeding source of the segment data sequence. The feeding unit may feed the segment data sequence to the receiving device via the network in response to the request from the receiving device based on the application control descriptor.

The metadata associated with the program in progress may set a human, a thing, a location, or a scene as a whole appearing in a synchronized program as a focus target and contains at least one of a title name, explanatory information, link information, a keyword, position information, and pointer information about the focus target.

The segment validity period of the segment data may be described by using PTS indicating a progress position of the corresponding program.

According to the first embodiment of the present disclosure, there is provided a feeding method by a feeding device including a broadcasting step for broadcasting a program to a receiving device via a broadcasting network by the feeding device, and a feeding step for feeding a segment data sequence containing at least one piece of segment data including a segment validity period indicating a synchronization period for progress of the program and metadata associated with the program in progress to the receiving device by the feeding device.

According to the first embodiment of the present disclosure, there is provided a program for controlling a feeding device, for causing a computer of the feeding device to perform processing including a broadcasting step for broadcasting a program to a receiving device via a broadcasting network, and a feeding step for feeding a segment data sequence containing at least one piece of segment data including a segment validity period indicating a synchronization period for progress of the program and metadata associated with the program in progress to the receiving device.

In the first embodiment of the present disclosure, a program is broadcasted to a receiving device via a broadcasting network and a segment data sequence containing at least one piece of segment data including a segment validity period indicating a synchronization period for progress of the program and metadata associated with the program in progress is fed to the receiving device.

According to a second embodiment of the present disclosure, there is provided a receiving device including a receiving unit that receives a program broadcast via a broadcasting network, an acquisition unit that acquires a segment data sequence containing at least one piece of segment data including a segment validity period indicating a synchronization period for progress of the program and metadata associated with the program in progress, and a presentation unit that presents information about the program to a user in synchronization with the progress of the program based on the acquired segment data sequence.

The receiving unit may receive also an application control descriptor containing a URL of a feeding unit serving as a feeding source of the segment data sequence. The acquisition unit may request feeding of the segment data sequence from the feeding unit via a network based on the application control descriptor.

According to the second embodiment of the present disclosure, there is provided a receiving method by a receiving device that receives a program broadcast via a broadcasting network, the receiving method including an acquiring step for acquiring a segment data sequence containing at least one piece of segment data including a segment validity period indicating a synchronization period for progress of the program and metadata associated with the program in progress by the receiving device, and a presenting step for resenting information about the program to a user in synchronization with the progress of the program based on the acquired segment data sequence by the receiving device.

According to the second embodiment of the present disclosure, there is provided a program for controlling a receiving device that receives a program broadcast via a broadcasting network, for causing a computer of the receiving device to perform processing including an acquiring step for acquiring a segment data sequence containing at least one piece of segment data including a segment validity period indicating a synchronization period for progress of the program and metadata associated with the program in progress, and a presenting step for presenting information about the program to a user in synchronization with the progress of the program based on the acquired segment data sequence.

In the second embodiment of the present disclosure, a segment data sequence containing at least one piece of segment data including a segment validity period indicating a synchronization period for progress of a program and metadata associated with the program in progress is acquired and information about the program is presented to the user in synchronization with the progress of the program based on the acquired segment data sequence.

According to a third embodiment of the present disclosure, there is provided a broadcasting system including a feeding device and a receiving device. The feeding device includes a broadcasting unit that broadcasts a program to the receiving device via a broadcasting network, and a feeding unit that feeds a segment data sequence containing at least one piece of segment data including a segment validity period indicating a synchronization period for progress of the program and metadata associated with the program in progress to the receiving device. The receiving device includes a receiving unit that receives the program broadcast from the feeding device via the broadcasting network, an acquisition unit that acquires the segment data sequence fed from the feeding device, and a presentation unit that presents information about the program to a user in synchronization with the progress of the program based on the acquired segment data sequence.

In the third embodiment of the present disclosure, a program is broadcasted to a receiving device via a broadcasting network and a segment data sequence containing at least one piece of segment data including a segment validity period indicating a synchronization period for progress of the program and metadata associated with the program in progress is fed to the receiving device by the feeding device. The segment data sequence fed from the feeding device is received and information about the program is presented to the user in synchronization with the progress of the program based on the acquired segment data sequence by the receiving device.

Advantageous Effects of Invention

According to the first embodiment of the present disclosure, a segment data sequence to easily realize a program progress synchronization information service can be fed to a receiving device.

According to the second embodiment of the present disclosure, the program progress synchronization information service can be provided to the user based on the fed segment data sequence.

According to the third embodiment of the present disclosure, the program progress synchronization information service can easily be realized.

BRIEF DESCRIPTION OF DRAWINGS

FIG. 7 is a diagram showing the data structure of a segment data sequence.

FIG. 8 is a diagram showing the data structure of metadata.

FIG. 9 is a diagram showing the data structure of associated metadata.

FIG. 10 is a diagram showing elements of description information contained in the associated metadata.

FIG. 11 is a diagram showing elements of link information contained in the associated metadata.

FIG. 12 is a diagram showing elements of keyword contained in the associated metadata.

FIG. 13 is a diagram showing elements of position information contained in the associated metadata.

FIG. 14 is a diagram showing elements of pointer positions contained in the associated metadata.

FIG. 22 is a diagram showing an example of the segment data sequence corresponding to FIG. 19.

FIG. 24 is a diagram showing an example of the segment data sequence corresponding to FIG. 23.

FIG. 25 is a block diagram showing a configuration example of a computer.

DESCRIPTION OF EMBODIMENT

A preferred embodiment (hereinafter, referred to as an embodiment) to carry out the present disclosure will be described in detail with reference to the drawings.

<1. Embodiment>

[Configuration Example of Broadcasting Equipment]

Figure 1:
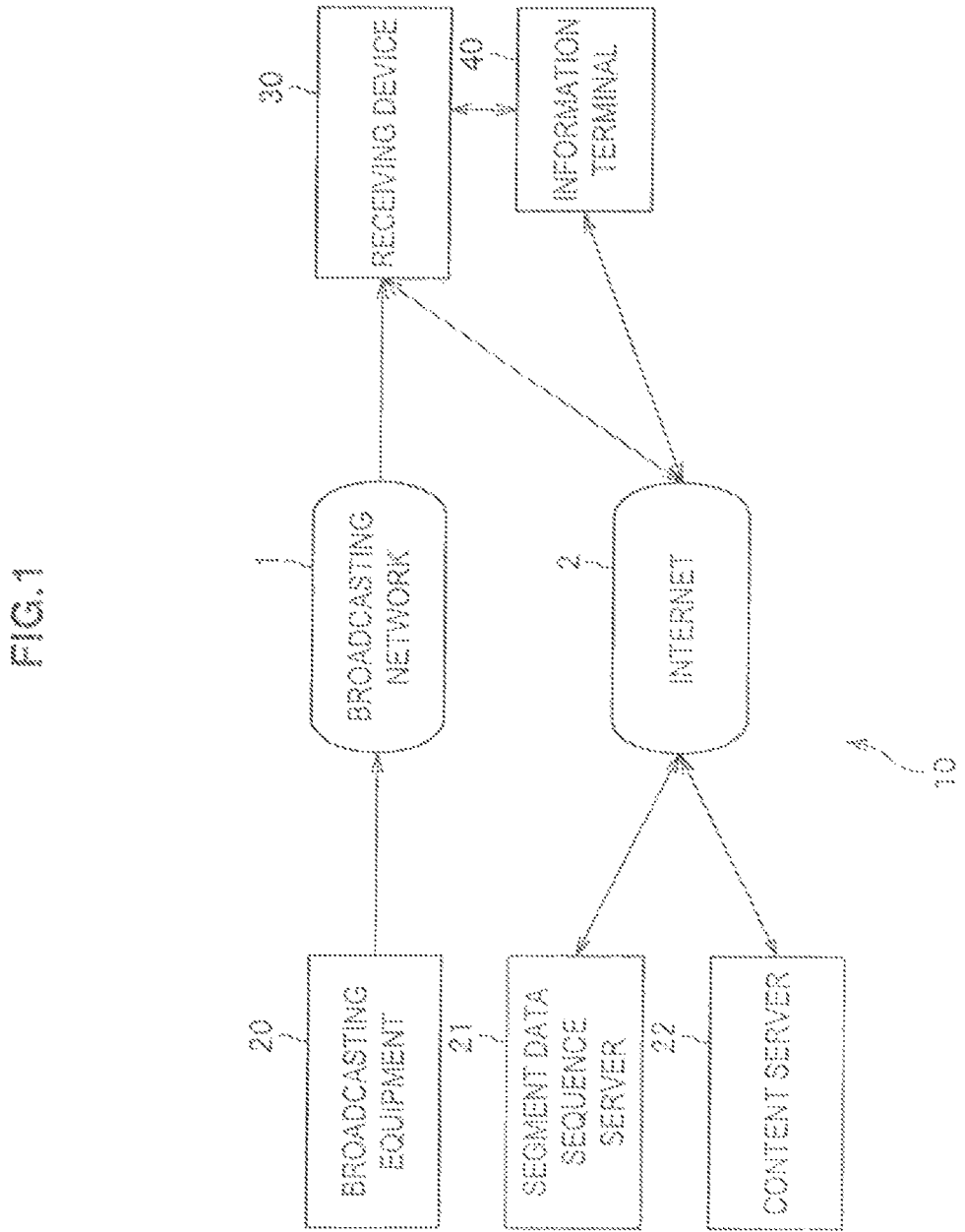
FIG. 1 is a block diagram showing a configuration example of a broadcasting system to which the present disclosure is applied.

FIG. 1 shows a broadcasting system as an embodiment. This broadcasting system 10 includes broadcasting equipment 20, a segment data sequence server 21, and a content server 22 provided on the broadcasting side and a receiving device 30 and an information terminal 40 provided on the receiving side.

The broadcasting system 10 realizes a program progress synchronization information service that presents information synchronized with the progress of a television program to the user. However, a program progress synchronization information service in the receiving device 30 depends on a resident application (hereinafter, abbreviated as a resident app) incorporated into the receiving device 30 in advance. Thus, the method of presenting information as a program progress synchronization information service in each of the receiving devices 30 is not necessarily common to all the receiving devices 30.

The broadcasting equipment 20 on the broadcasting side broadcasts a digital broadcasting signal via a broadcasting network 1. As the broadcasting network 1, a digital terrestrial broadcasting network, a satellite broadcasting network, a cable television network and the like can be assumed. The broadcast digital broadcasting signal includes signals of video, audio, subtitles of a program.

Further, an application control descriptor to control the receiving device 30 when realizing a program progress synchronization information service is contained in a predetermined position of a digital broadcasting signal. The application control descriptor of the same content is repeatedly broadcast in a predetermined period. Accordingly, a situation in which a program progress synchronization information service cannot be realized due to a failure to receive the application control descriptor at the receiving device 30 can be inhibited from occurring.

The application control descriptor is broadcasted by including in SDT (service description table) contained in a digital broadcasting signal when a program progress synchronization information service is provided in units of broadcasting services (so-called broadcasting channels). When a program progress synchronization information service is provided in units of programs, the application control descriptor is broadcasted by including in EIT (event information table) contained in a digital broadcasting signal. In this case, the application control descriptor may be broadcast by including in PMT (program map table) of a program. The application control descriptor will be described in detail later.

The segment data sequence server 21 feeds application control data (including a segment data sequence described later) necessary to realize a program progress synchronization information service by the receiving device 30 to the receiving device 30 via an Internet 2 in response to a request from the receiving device 30.

The content server 22 feeds content presented to the user as a program progress synchronization information service in response to a request from the receiving device 30 or the information terminal 40 via the Internet 2.

The receiving device 30 on the receiving side receives a digital broadcasting signal broadcast from the broadcasting equipment 20 via the broadcasting network 1 and outputs video and audio of a program or CM to a subsequent monitor (not shown) based on the received digital broadcasting signal. The receiving device 30 also acquires a segment data sequence from the segment data sequence server 21 based on the application control descriptor contained in a digital broadcasting signal. Further, the receiving device 30 executes a resident app held by the receiving device 30 to realize a program progress synchronization information service by feeding a segment data sequence to the resident app.

The receiving device 30 can be connected to the information terminal 40 via a predetermined interface. The connection between the receiving device 30 and the information terminal 40 may be a wireless connection using a wireless LAN, Bluetooth (registered trademark), infrared rays or the like or a wired connection via a wired LAN, USB, HDMI or the like.

Information as a program progress synchronization information service may be displayed by combining video of a new information service with video of a program or CM or causing the information terminal 40 connected to the receiving device 30 to display on the screen thereof.

The receiving device 30 may be configured as a single unit or contained in, for example, a digital television set, video recorder or the like.

The information terminal 40 provides a program progress synchronization information service to the user by following control from the receiving device 30. As the information terminal 40, for example, a smartphone, mobile phone, tablet PC, digital television set, and video recorder can be cited.

[Configuration Example of the Receiving Device 30]

Figure 2:
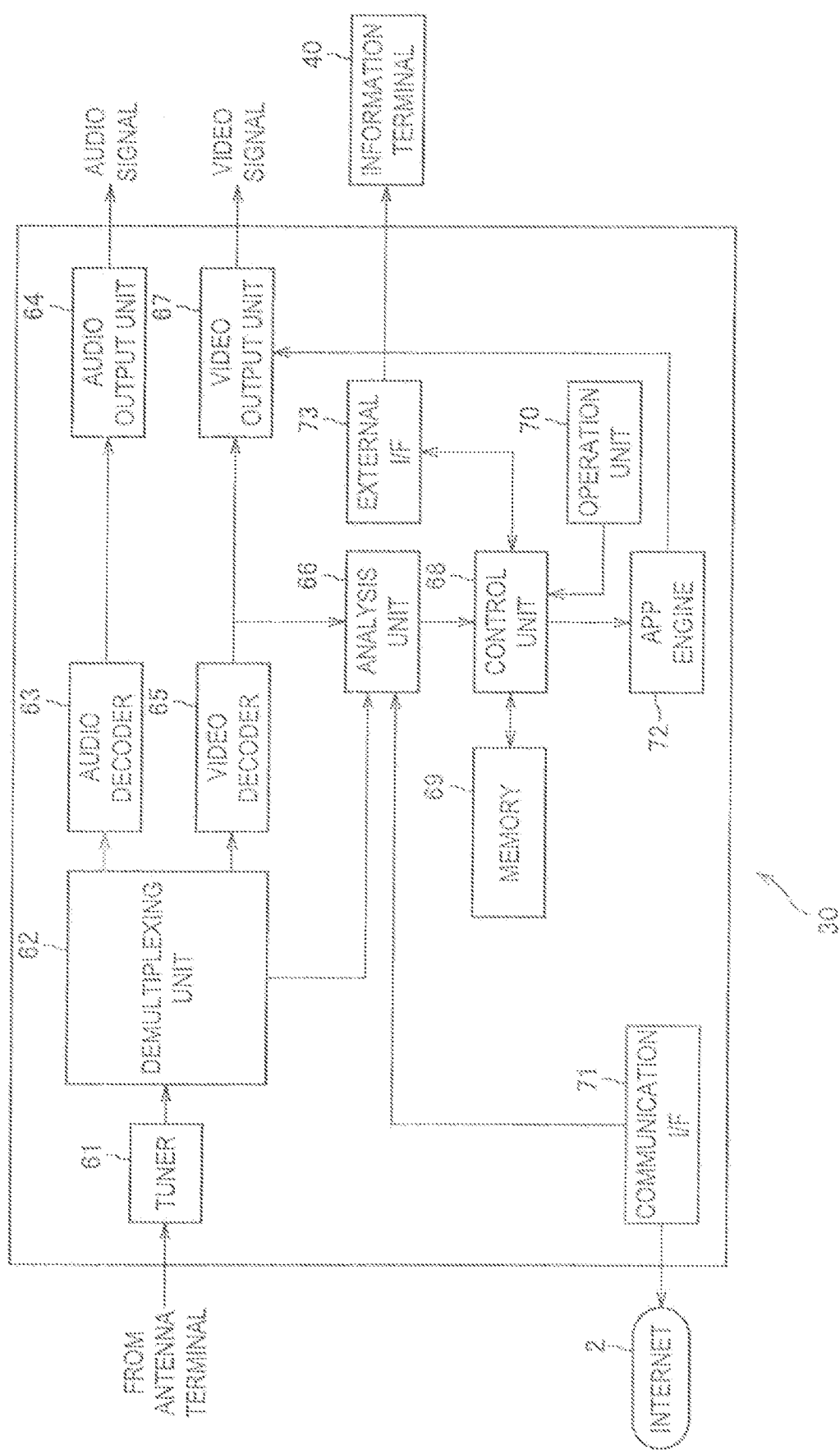
FIG. 2 is a block diagram showing a configuration example of a receiving device to which the present disclosure is applied.

FIG. 2 shows a configuration example of the receiving device 30. The receiving device 30 includes a tuner 61, a demultiplexing unit 62, an audio decoder 63, an audio output unit 64, a video decoder 65, an analysis unit 66, a video output unit 67, a control unit 68, a memory 69, an operation unit 70, a communication I/F 71, an app engine 72, and an external I/F 73.

The tuner 61 receives and demodulates a digital broadcasting signal corresponding to a service (broadcasting channel) tuned in by the user and outputs resultant TS (transport stream) to the demultiplexing unit 62.

The demultiplexing unit 62 demultiplexes an audio encoded signal and a video encoded signal from TS input from the tuner 61 and outputs the audio encoded signal to the audio decoder 63 and the video encoded signal to the video decoder 65 and the analysis unit 66. Further, the demultiplexing unit 62 demultiplexes a control signal containing SDT/EIT in which an application control descriptor may be contained from TS and outputs the control signal to the analysis unit 66.

The audio decoder 63 decodes an input audio encoded signal and outputs a resultant audio signal to the audio output unit 64. The audio output unit 64 outputs the input audio signal to the subsequent stage (for example, a speaker).

The video decoder 65 decodes an input video encoded signal and outputs a resultant video signal to the analysis unit 66 and the video output unit 67.

The analysis unit 66 detects and analyzes an application control descriptor contained in SDT/EIT input from the demultiplexing unit 62, controls the communication I/F 71 in accordance with an analysis result, and acquires application control data from the segment data sequence server 21 via the Internet 2.

Figure 3:
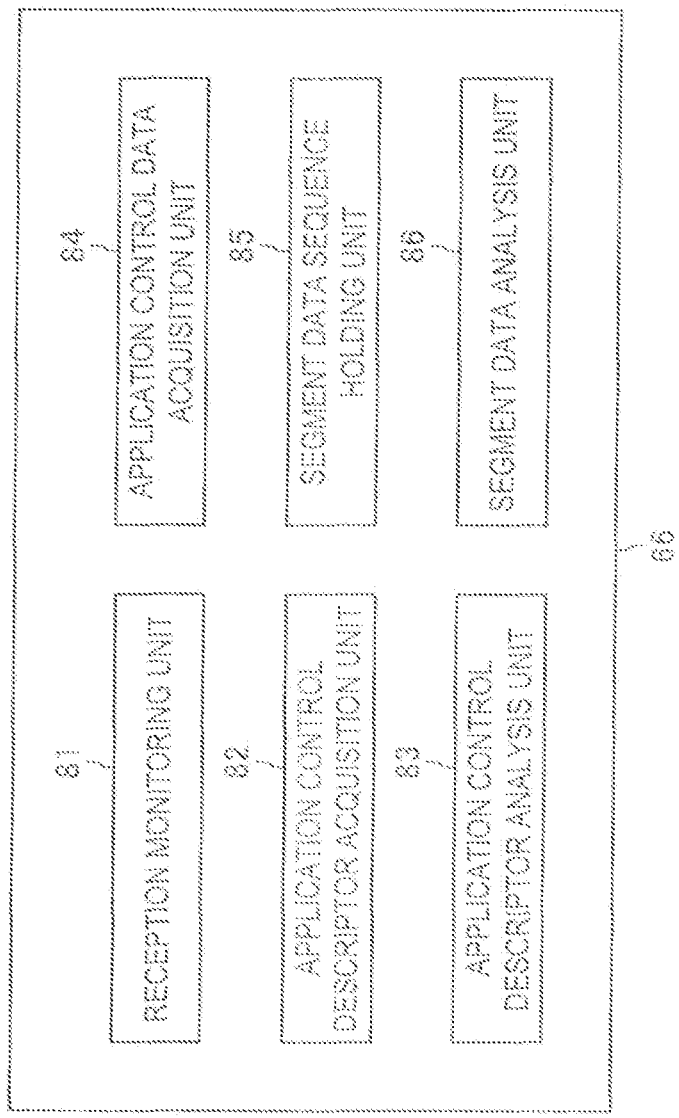
FIG. 3 is a diagram showing functional blocks contained in an analysis unit of the receiving device.

FIG. 3 shows functional blocks contained in the analysis unit 66. The analysis unit 66 includes a reception monitoring unit 81, an application control descriptor acquisition unit 82, an application control descriptor analysis unit 83, an application control data acquisition unit 84, a segment data sequence holding unit 85, and a segment data analysis unit 86.

The reception monitoring unit 81 monitors service (channel) changes caused by a tuning operation and the start and end of a program in the service being received. The application control descriptor acquisition unit 82 holds SDT/EIT input from the demultiplexing unit 62 and acquires an application control descriptor from the SDT/EIT. The application control descriptor analysis unit 83 analyzes the application control descriptor corresponding to the tuned in service or program.

The application control data acquisition unit 84 acquires application control data from the segment data sequence server 21 based on an analysis result of the application control descriptor corresponding to the tuned in service or program. A segment data holding unit 88 holds a segment data sequence constituting the acquired application control data. The segment data analysis unit 86 analyzes each piece of segment data constituting the segment data sequence.

The description returns to FIG. 2. The video output unit 67 outputs a video signal input from the video decoder 65 to the subsequent stage (for example, a display). Also, the video output unit 67 combines video of a program progress synchronization information service input from the app engine 72 and a video signal input from the video decoder 65 to output the combined video to the subsequent stage.

The control unit 68 controls the receiving device 30 as a whole by executing a control program recorded in the memory 69. The control program executed by the control unit 68 is recorded in the memory 69. The control program can be updated based on a digital broadcasting signal or update data fed via the Internet 2. The operation unit 70 receives various operations from the user and notifies the control unit 68 of corresponding operation signals.

The communication I/F 71 is connected to the segment data sequence server 21 or the content server 22 via the Internet 2 according to the control of the analysis unit 66 or the app engine 72. The app engine 72 executes a resident app held in advance according to the control of the control unit 68. The executed resident app realizes a program progress synchronization information service by using a segment data sequence fed from the control unit 68. The resident app held by the app engine 72 can be updated based on a digital broadcasting signal or update data fed via the Internet 2.

The external I/F 73 establishes connection to the information terminal 40 wirelessly or by wire.

[Configuration Example of the Information Terminal 40]

Figure 4:
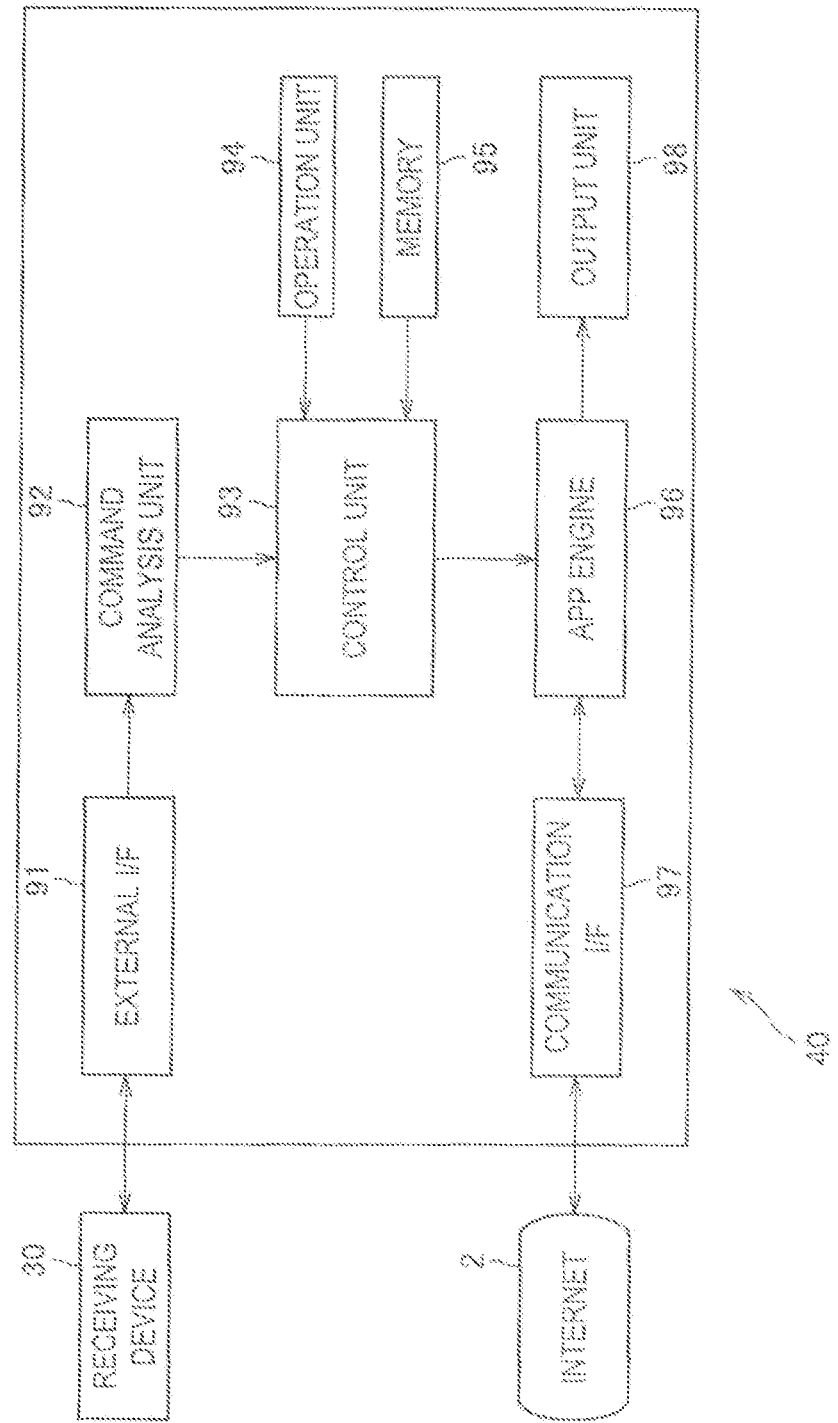
FIG. 4 is a block diagram showing a configuration example of an information terminal.

FIG. 4 shows a configuration example of the information terminal 40. In FIG. 4, however, only units involved in realizing a program progress synchronization information service in cooperation with the receiving device 40 are shown and other units are omitted when appropriate.

The information terminal 40 includes an external I/F 91, a command analysis unit 92, a control unit 93, an operation unit 94, a memory 95, an app engine 96, a communication I/F 97, and an output unit 98.

The external I/F 91 is connected to the external I/F 73 of the receiving device 30 wirelessly or by wire. The command analysis unit 92 analyzes a command from the receiving device 30 input via the external I/F 73 and outputs an analysis result thereof to the control unit 93.

The control unit 93 controls the information terminal 40 as a whole by executing a control program (for example, Android, iOS or the like as a platform) recorded in the memory 65. Also, the control unit 93 realizes a program progress synchronization information service by controlling the app engine 96 based on an analysis result from the command analysis unit 92.

The control program executed by the control unit 93 is recorded in the memory 95. The operation unit 94 receives various operations from the user and notifies the control unit 93 of corresponding operation signals.

The app engine 96 executes a resident app corresponding to a program progress synchronization information service for the information terminal 40 held in advance according to the control of the control unit 93 and outputs a video signal and audio signal of resultant information to the output unit 98. The communication I/F 97 is connected to the content server 22 via the Internet 2 according to the control of the app engine 96.

The output unit 98 displays video corresponding to a video signal input from the app engine 96 and outputs audio corresponding to an audio signal.

[Application Control Descriptor]

Next, the application control descriptor broadcast by including in a digital broadcasting signal will be described. The application control descriptor is broadcasted by including in SDT or EIT of a digital broadcasting signal.

Figure 5:
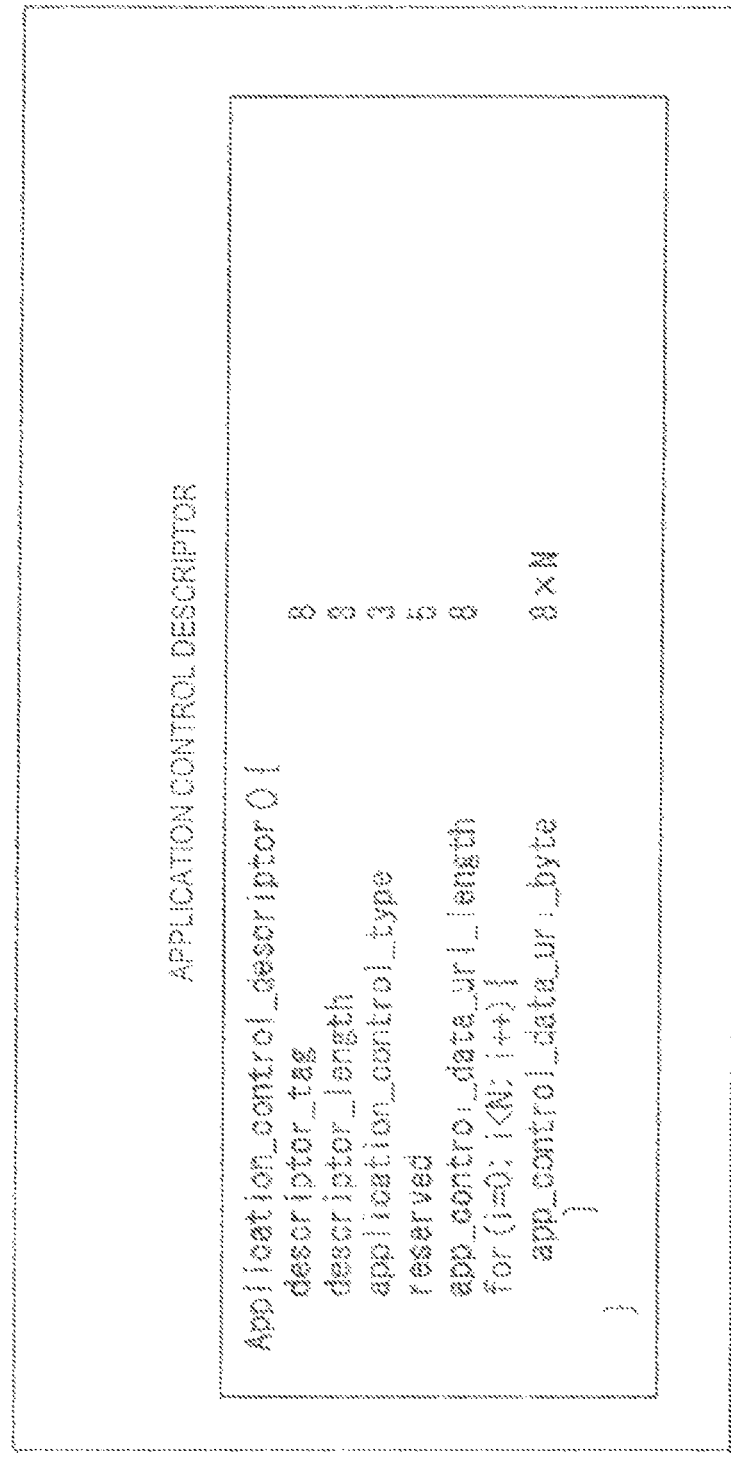
FIG. 5 is a diagram showing an example of syntax of an application control descriptor.

FIG. 5 shows an example of syntax of an application control descriptor.

In an application control descriptor, descriptor_tag indicating the corresponding service (broadcasting channel) or program, descriptor_length indicating the data length of the application control descriptor, and application_control_type indicating the application control type are described.

Further, in an application control descriptor, app_control_data_url_length indicating the data length of URL to identify the location from which application control data is acquired (segment data sequence server 21) and app_control_data_url_byte indicating the URL are described.

[Application Control Data]

Next, application control data fed from the receiving device 30 to the segment data sequence server 21 will be described. The application control data is data needed to realize a program progress synchronization information service by the receiving device 30.

Figure 6:
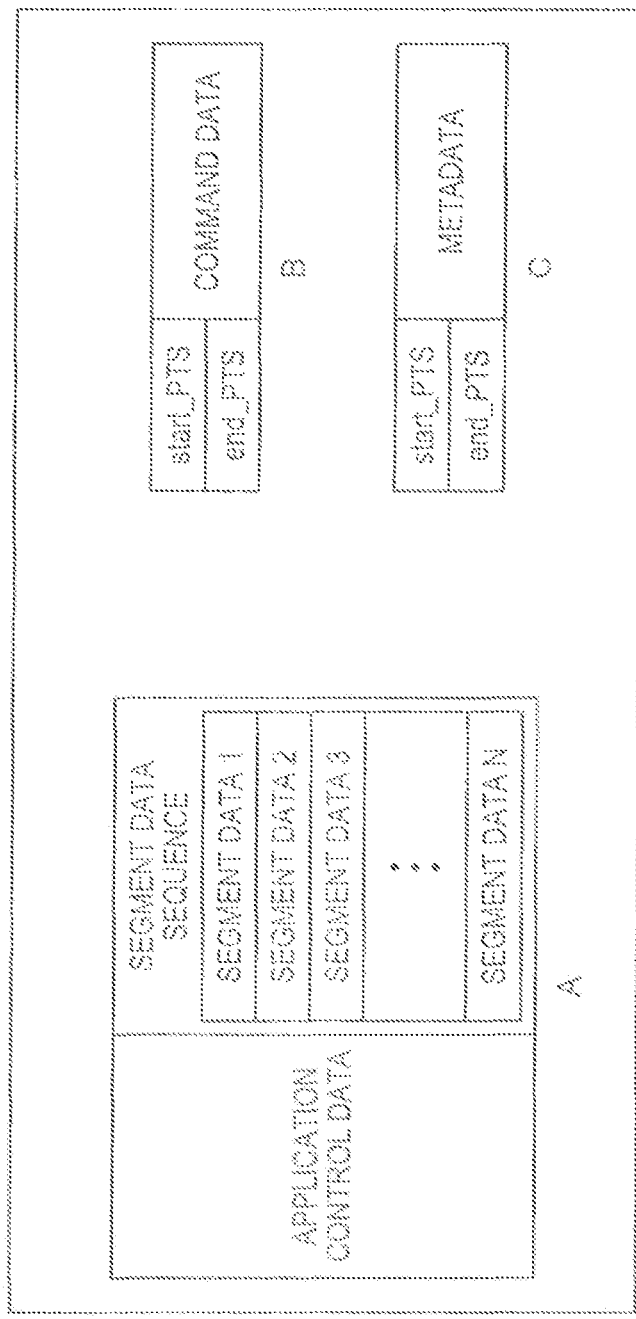
FIG. 6 is a diagram showing the structure of application control data.

FIG. 6 shows the structure of application control data. As shown in A of FIG. 6, the application control data contains a segment data sequence constituted of a plurality of pieces of segment data.

Each piece of segment data is constituted of a segment validity period and command data (B of FIG. 6) or a segment validity period and metadata (C of FIG. 6).

The segment validity period is indicated by start_PTS and end_PTS indicating two points on a progress time axis of the corresponding program. The segment data is considered to be valid if the progress timing of the program is within the segment validity period and the segment data is considered to be invalid if the progress timing of the program is prior to or past the segment validity period.

In one piece of application control data (segment data sequence), segment data containing command data and segment data containing metadata can be mixed.

FIGS. 7 to 14 show detailed examples of the data structure of a segment data sequence. The data structure is assumed to be described in XML and an @ attached item indicates an attribute attendant on an upper element and otherwise, an item indicates an element.

FIG. 7 shows the data structure of a segment data sequence. In the segment data sequence (segment_sequence), @segment_number indicating the number of each piece of segment data, start_PTS indicating the PTS value of start timing of a segment validity period, and end_PTS indicating the PTS value of end timing of the segment validity period are described. The counter value of a 90 KHz clock embedded in a video stream or audio stream may be used as the PTS value, but the absolute time shown by the hour/minute/second or a relative time after the start of a program may also be used. Further, one of command data or metadata is described in each piece of segment data.

Because segment data containing metadata is used in a program progress synchronization information service, metadata of segment data will be described in detail.

FIG. 8 shows the structure of metadata in segment data.

@type indicates the type (metadata type) of the metadata. Metadata types include app data (application data), text subtitle data (caption), bitmap subtitle data (subtitle), and associated metadata (meta).

@target indicates the application that should process the metadata. If, however, the application that should process the metadata is a resident app held in the receiving device 30 in advance, @target is omitted. The resident app is used in a program progress synchronization information service and thus, @target is omitted.

Data in a different structure is described for each metadata type in ##defined structure. Metadata whose metadata type is associated metadata is used in a program progress synchronization information service and thus, the data structure of associated metadata (meta) will be described.

FIG. 9 shows the data structure of associated metadata (meta). A plurality of pieces of associated metadata can be described and @focus_type and @focus_name that are needed are described for each piece of associated metadata. @focus_type is information indicating the type (focus type) of a thing (focus target) on the screen associated with the metadata and a human, a thing, a location, or the screen as a whole (general) is specified. The title name of a focus target (a human, a thing, a location, or the screen as a whole (general)) is described in @focus_name.

An explanation of a focus target is described in explanation. Link information associated with a focus target is described in link. Keywords associated with a focus target are described in keyword. Position information (latitude, longitude) associated with a focus target is described in location. The position (pointer position) of a focus target on the screen is described in pointer. Items from explanation to pointer are not mandatory and as many items as needed may be described.

FIG. 10 shows elements of explanation as an item of associated metadata. Any number of pieces of explanatory text associated with a focus target can be described in explanation. The title name of an explanation is described in @title. The type (explanatory type) of an explanation is described in @type. As the explanatory type, definition, biography, background, relation, access, introduction or the like are described. @logo is not mandatory and the URL (for example, the content server 22) from which a logo image corresponding to the explanation is acquired is described therein.

FIG. 11 shows elements of link as an item of associated metadata. The title name of link information is described in @title. The type (link type) of link information is described in @type. As the link type, info is described if the link destination is information such as a web page and content is described if the link destination is content such as animation or music. The URL of the link destination is described in @url. @logo is not mandatory and the URL (for example, the content server 22) from which a logo image corresponding to the link destination is acquired is described therein.

FIG. 12 shows elements of keyword as an item of associated metadata. A character string of any number of keywords is described in keyword.

FIG. 13 shows elements of location as an item of associated metadata. The title name of location information is described in @title. The longitude of position information is described in @longitude. The latitude of position information is described in @latitude.

FIG. 14 shows elements of pointer as an item of associated metadata. The horizontal pointer position is described in @horizontal. The vertical pointer position is described in @vertical.

[Operation of the Receiving Device 30]

Figure 15:
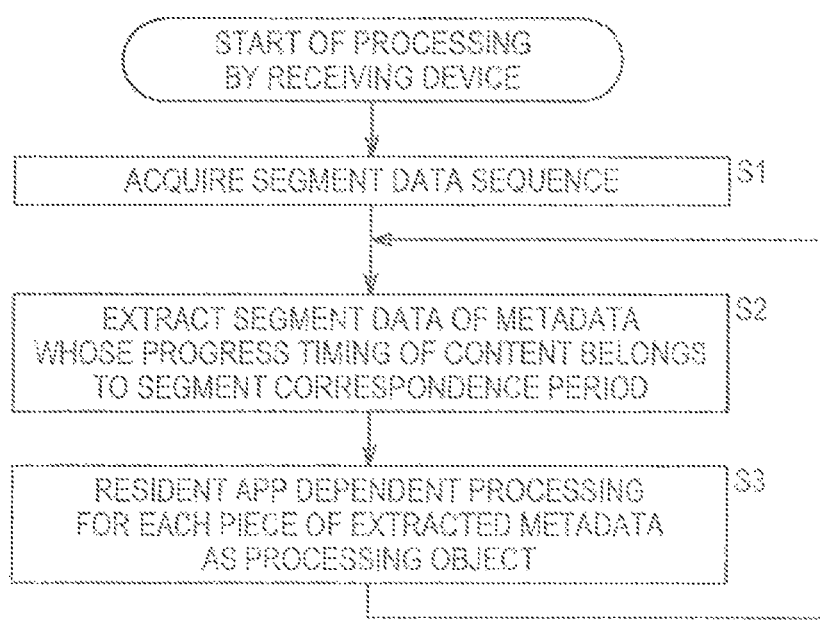
FIG. 15 is a flow chart illustrating processing of the receiving device.

Next, processing to realize a program progress synchronization information service by the receiving device 30 will be described with reference to FIG. 15. FIG. 15 is a flow chart illustrating processing of the receiving device 30.

The processing is performed repeatedly while the receiving device 30 receives a program and it is assumed that the receiving device 30 has acquired and held SDT/EIT contained in a digital broadcasting signal.

In step S1, the reception monitoring unit 81 of the analysis unit 66 detects any change of the service (broadcasting channel) or program being received. If any application control descriptor is contained in SDT corresponding to the changed service or EIT corresponding to the changed program, the application control descriptor acquisition unit 82 acquires and feeds the application control descriptor to the application control descriptor analysis unit 83. The application control descriptor analysis unit 83 analyzes the application control descriptor. The application control data acquisition unit 84 acquires application control data (segment data sequence) from the segment data sequence server 21 based on an analysis result of the application control descriptor. The acquired application control data (segment data sequence) is held in the segment data sequence holding unit 85.

In step S2, the segment data analysis unit 86 detects segment data, from segment data constituting the held segment data sequence, that matches progress timing of the program being received. More specifically, segment data having PTS indicating the progress position of the program being received in the segment validity period (in the range between start_PTS and end_PTS) thereof is extracted.

In step S3, if the extracted segment data contains metadata, the segment data analysis unit 86 feeds the metadata to the app engine 72. Correspondingly, the app engine 72 activates a resident app and feeds the fed metadata to the resident app. Then, processing dependent on the resident app is performed to realize a program progress synchronization information service.

Figure 16:
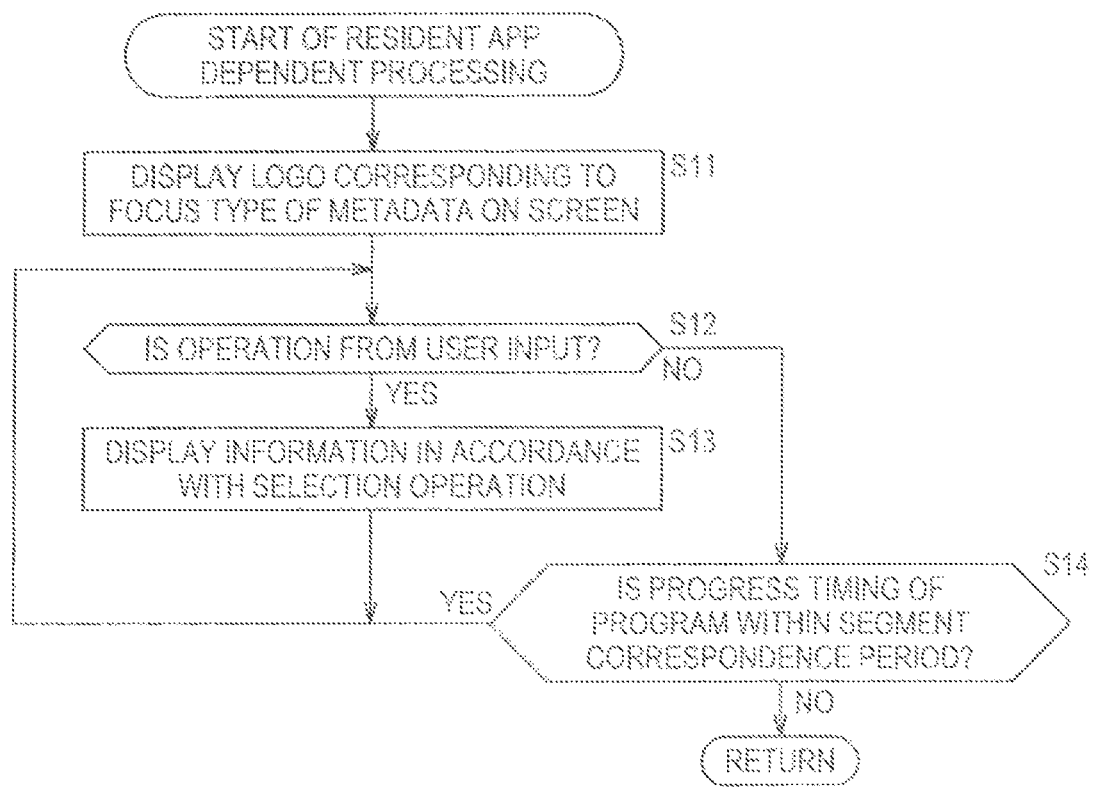
FIG. 16 is a flow chart illustrating resident app dependent processing.

The processing dependent on the resident app (hereinafter, called resident app dependent processing) in step S3 will be described in detail with reference to FIG. 16. FIG. 16 is a flow chart illustrating resident app dependent processing.

In step S11, the resident app causes the display of a logo corresponding to the focus type (a human, a thing, a location, or the screen as a whole (general)) of metadata on the screen of the television program in progress. It is assumed that image data of the logo corresponding to each focus type is held by the resident app in advance. The user viewing the television program can be notified of the presence of metadata associated with the progress of program by the logo display.

In step S12, the resident app determines whether the user has performed any operation such as the selection of log corresponding to the focus type displayed on the screen. When determined that the user has performed an operation, the resident app proceeds to the processing in step S13 and displays program progress synchronization information in accordance with a user's operation. Then, the processing is returned to step S12 to repeat the above process.

When determined in step S12 that the user has not performed any operation, the resident app proceeds to the processing in step S14 and determines whether progress timing of the program being received is within the segment validity period. If progress timing of the program is determined to be within the segment validity period, the processing is returned to step S12 to repeat the above process. If progress timing of the program is determined not to be within the segment validity period (progress timing of the program being received is past the segment validity period), the resident app dependent processing using metadata of the focused segment data is terminated.

[Concrete Display Example of Resident App Dependent Processing]

Next, the screen display of the receiving device 30 or the information terminal 40 by resident app dependent processing will be described.

Figure 17:
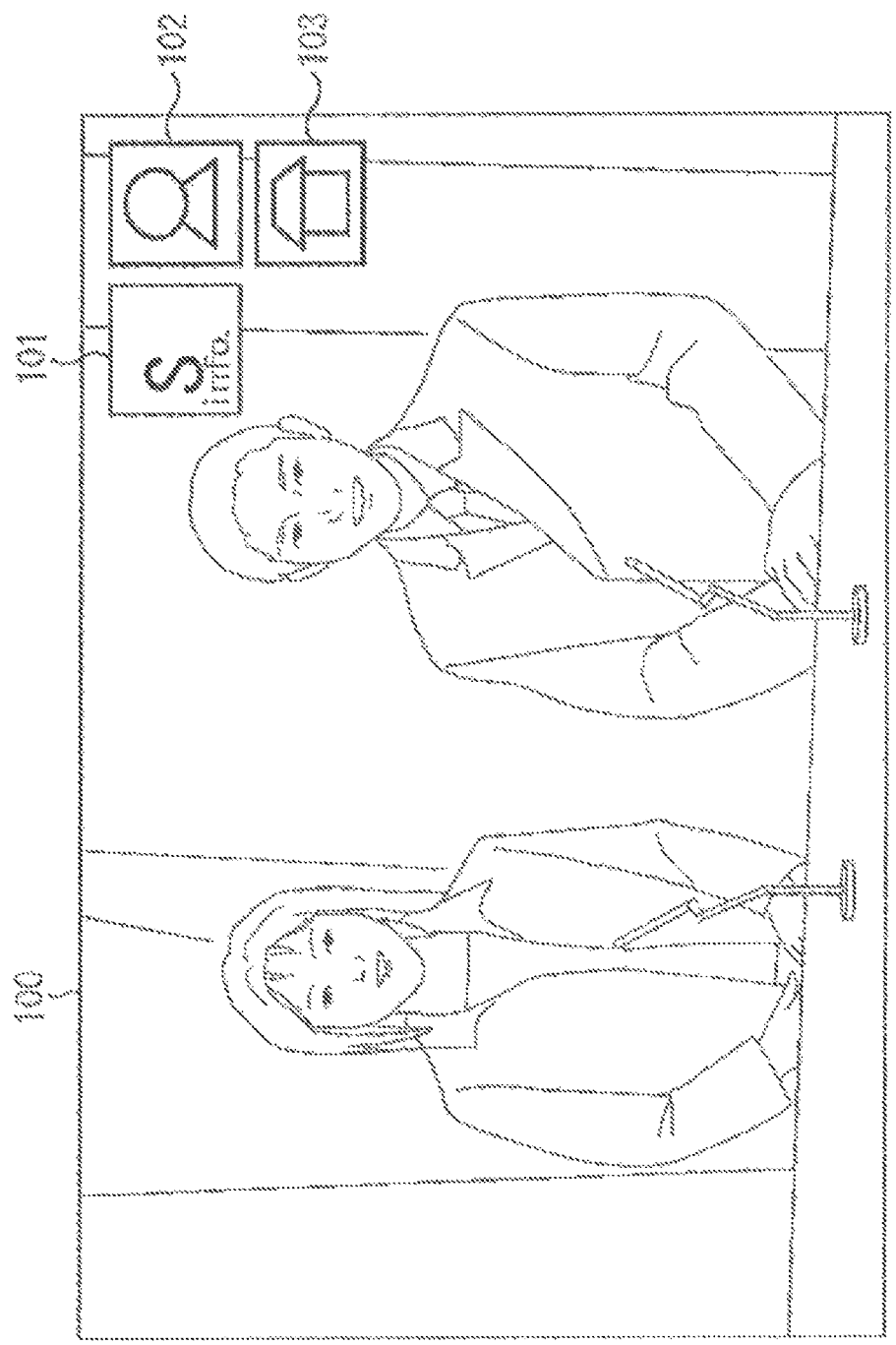
FIG. 17 is a diagram showing a display example of the screen by the resident app dependent processing.

FIG. 17 shows a display example of screen video output from the receiving device 30 when a program progress synchronization information service is provided by associating with a news program.

In FIG. 17, video of a news program in which newscasters appear is displayed on a display screen 100 and three logos corresponding to focus types, that is, a scene information logo 101 corresponding to the screen as a whole, a human information logo 102 whose focus type corresponds to a human, and a location information logo 103 whose focus type corresponds to a location are displayed at the upper right of the screen. Incidentally, image data of logos corresponding to focus types is held by the resident app in advance. The user can recognize that three types of metadata can be displayed through the display of these logos. If the user performs an operation to select one of these logos, the corresponding information is displayed.

Figure 18:
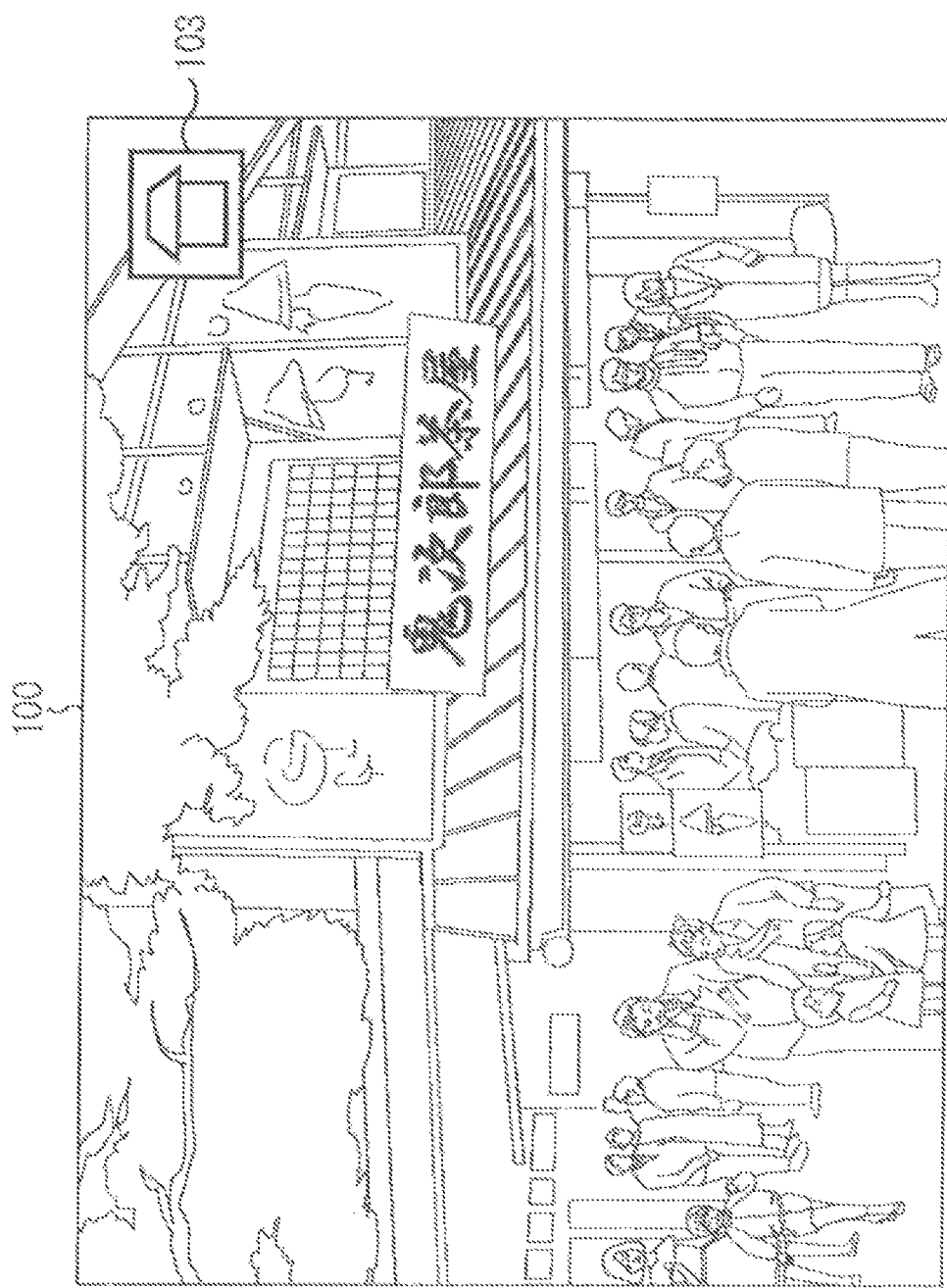
FIG. 18 is a diagram showing a display example of the screen by the resident app dependent processing.

FIG. 18 shows a display example of the screen of the receiving device 30 when a program progress synchronization information service is provided by associating with an information program.

In FIG. 18, video of an information program in which a shop called "Onijiro Chaya" is presented is displayed on the display screen 100 and the location information logo 103 corresponding to the focus type thereof is displayed at the upper right of the screen. The user can recognize that metadata whose focus type is the location can be displayed through the display of the location information logo 103. If the user performs a selection operation of the location information logo 103, the screen display is changed as shown in FIG. 19.

Figure 19:
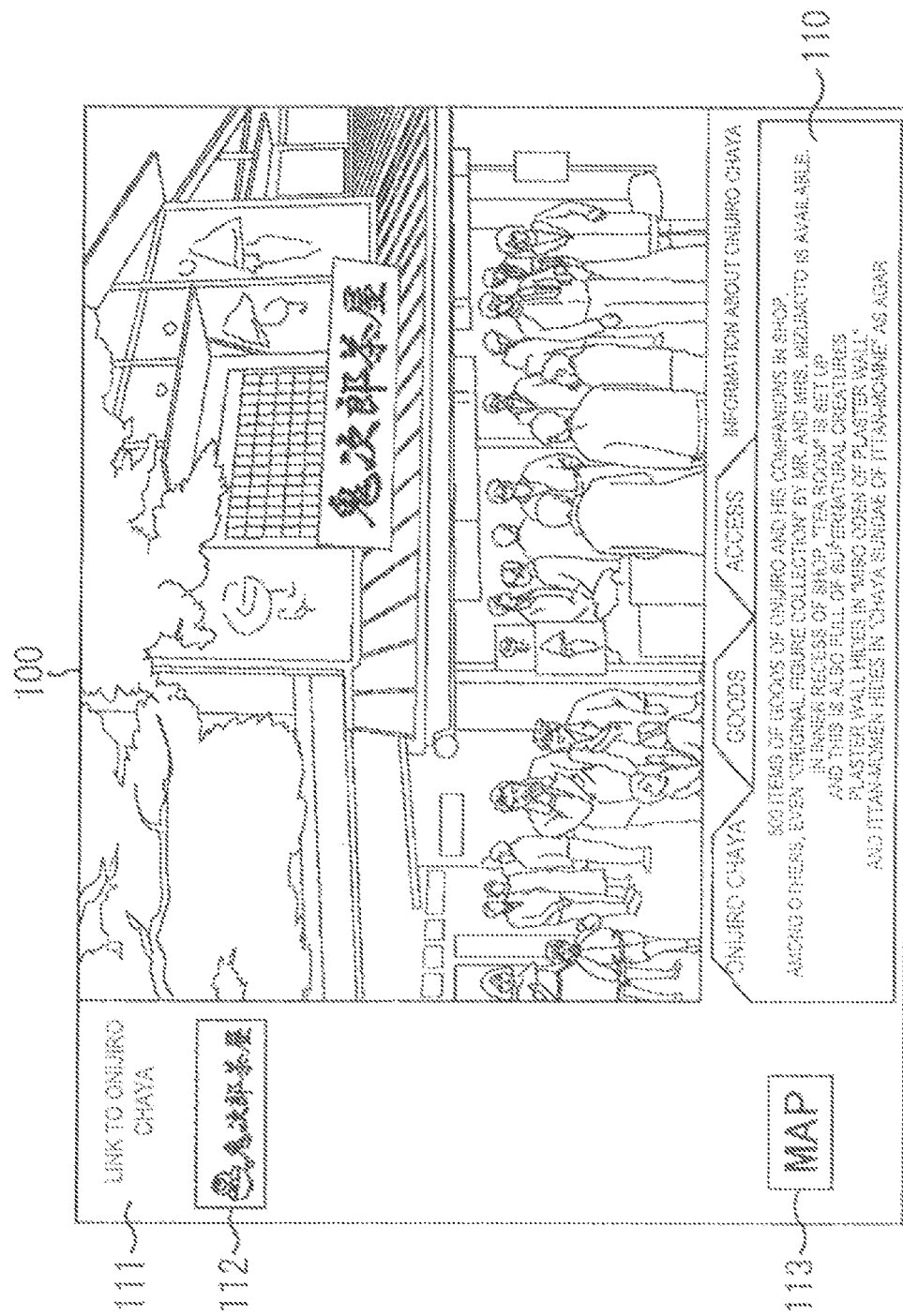
FIG. 19 is a diagram showing a display example of the screen by the resident app dependent processing.

That is, as shown in FIG. 19, the video of the Information program is reduced and a plurality of tabs whose title names are "Onijiro Chaya", "Goods", and "Access" and an explanation 110 of the selected tab are displayed below the reduced video based on explanatory information (explanation) of the associated metadata. In this case, the tab of "Onijiro Chaya" is selected and thus, an explanation of "Onijiro Chaya" is displayed.

A hyperlink 111 of "link to Onijiro Chaya" is displayed based on @title of link information (link) of associated metadata and also a link logo image 112 of Onijiro Chaya acquired based on @logo of the link information is displayed above on the left of the video of the information program as a reduced display. When the user selects the hyperlink 111 or the link logo image 112, the browser is activated and connected to the link destination indicated by @url of the link information to display the web page of "Onijiro Chaya".

A "MAP" button 113 is displayed below on the left of the video of the information program as a reduced display due to the presence of position information (location) of metadata. When the user selects the "MAP" button 113, a map of the location indicated by the latitude and longitude of the position information is displayed.

Figure 20:
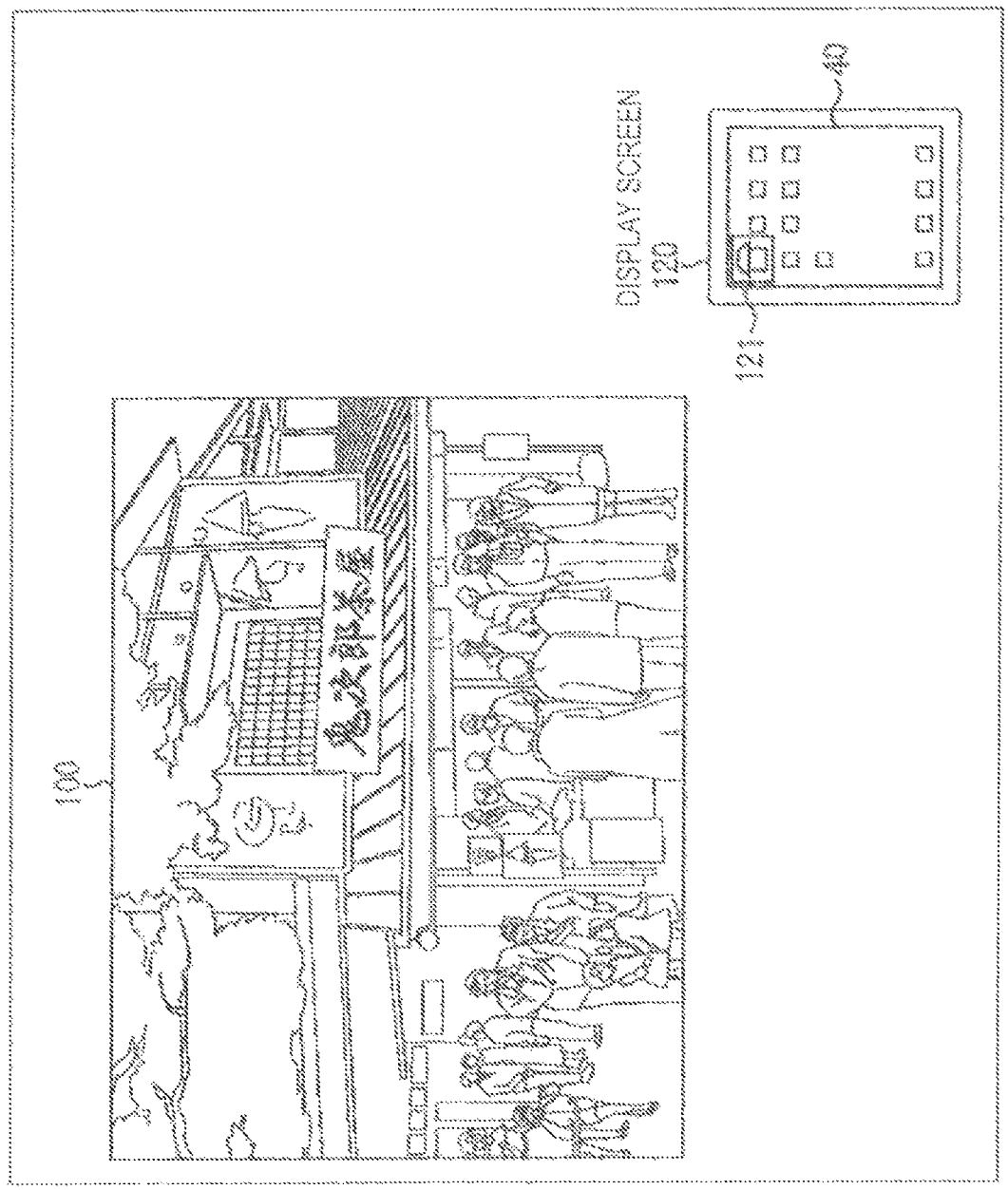
FIG. 20 is a diagram showing a display example of the screen by the resident app dependent processing.
Figure 21:
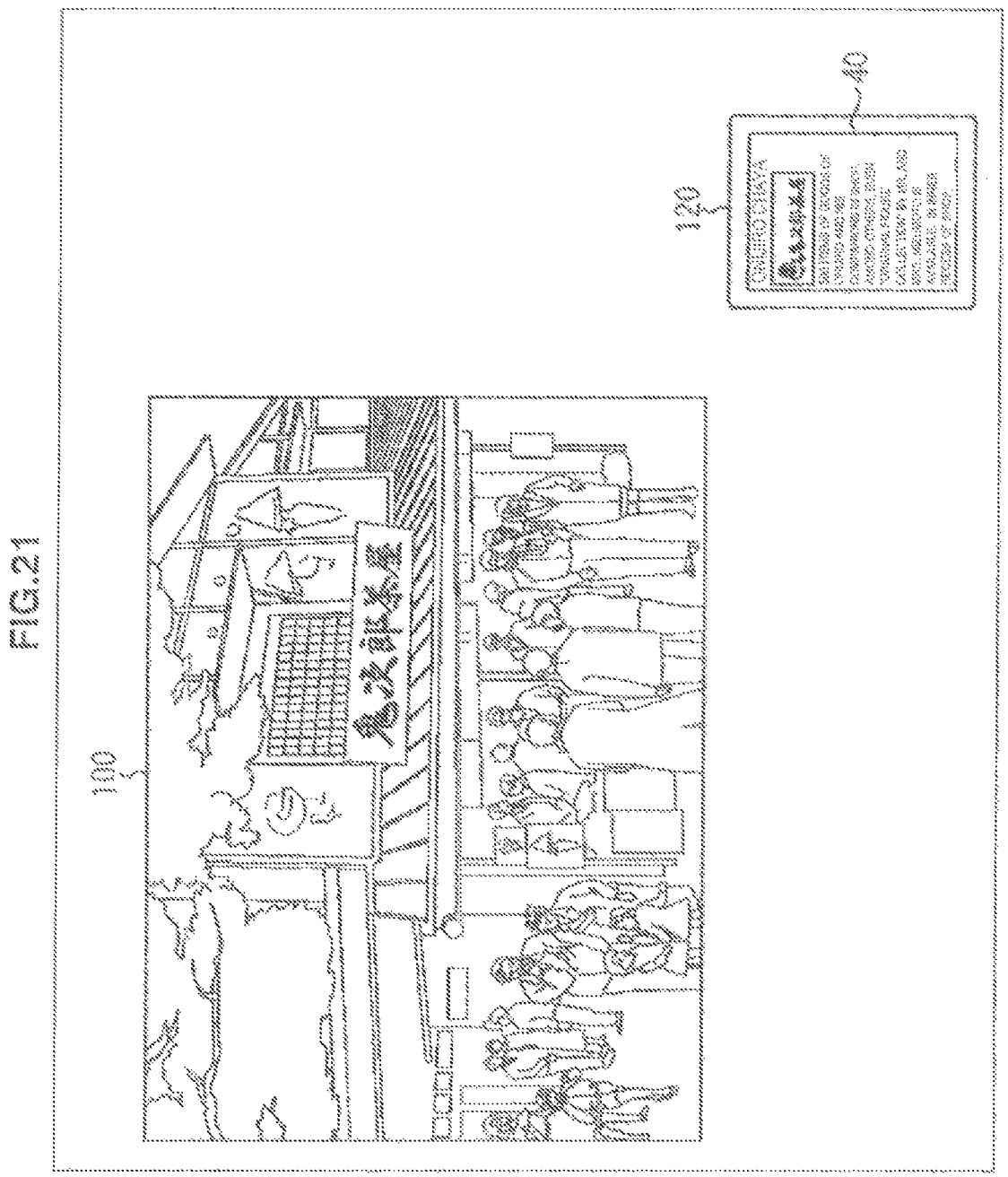
FIG. 21 is a diagram showing a display example of the screen by the resident app dependent processing.

FIGS. 20 and 21 show display examples of the screens of the receiving device 30 and the information terminal 40 when, in cooperation with the information terminal 40, a program progress synchronization information service is provided by associating with the information program.

In this case, the display screen 100 of the receiving device 30 displays only video of the program and the location information logo 103 corresponding to the focus type is displayed on a display screen 120 of the information terminal 40. Thus, the display screen 100 of the receiving device 30 can be limited to program video by causing the display screen 120 of the information terminal 40 to display the logo in accordance with the focus type. When the user performs a selection operation of the location information logo 103 on the display screen 120, the screen display is changed as shown in FIG. 21.

That is, as shown in FIG. 21, an explanation based on explanatory information (explanation) of the associated metadata is displayed on the display screen 120 of the information terminal 40. In this case, there is no need to reduce the video of the program displayed on the display screen 100 of the receiving device 30.

Incidentally, the program progress synchronization information service shown in FIGS. 19 to 21 can be realized by, for example, a segment data sequence shown in FIG. 22.

Figure 23:
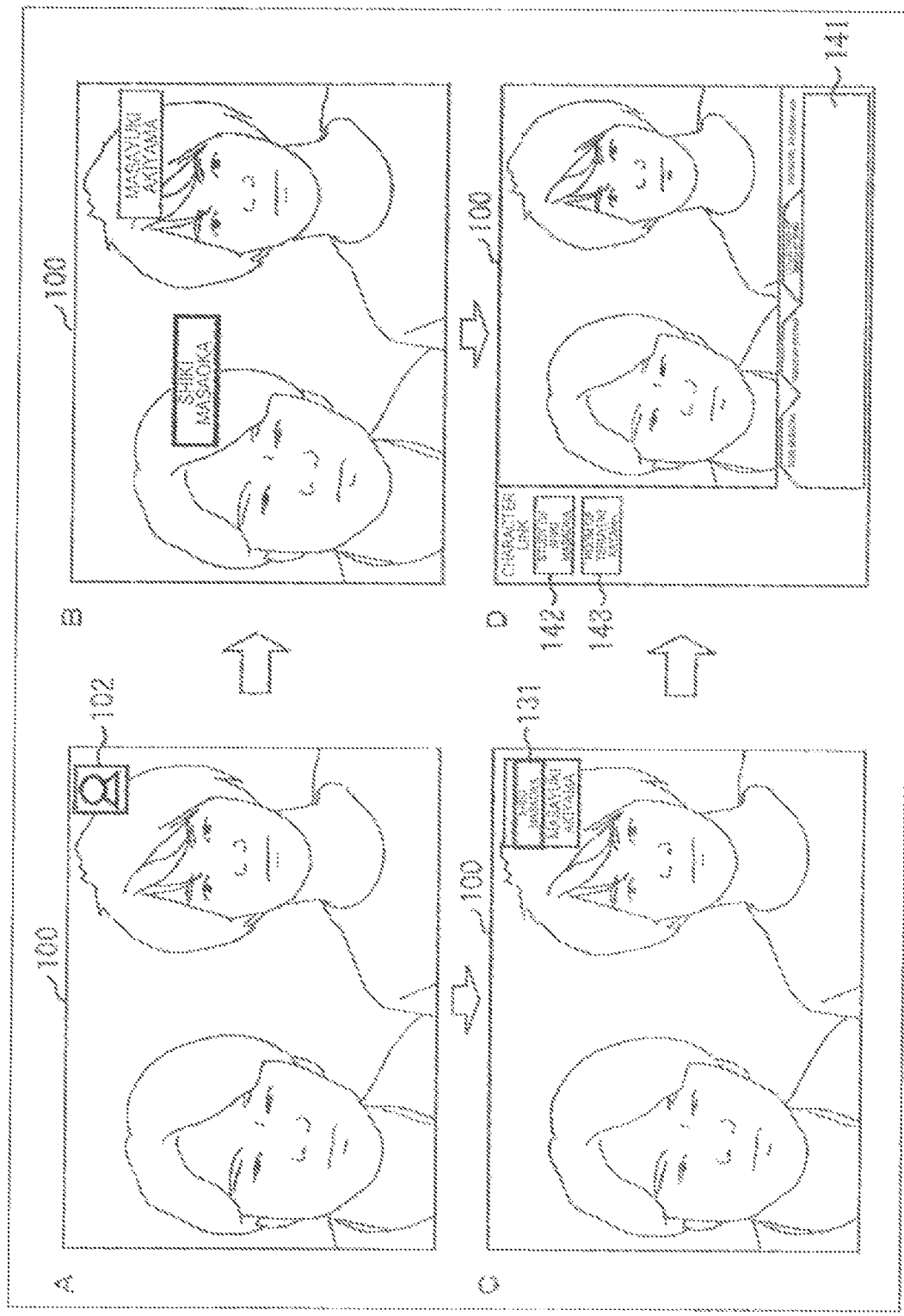
FIG. 23 is a diagram showing a display example of the screen by the resident app dependent processing.

FIG. 23 shows the transition of screen video output by the receiving device 30 when a program progress synchronization information service is provided by associating with a drama program.

In A of FIG. 6, two characters appearing the drama are displayed on the display screen 100 and the human information logo 102 whose focus type corresponds to a human is displayed on the upper right corner thereof. When the user of the receiving device 30 performs a selection operation of the human information logo 102, the display screen 100 makes the transition to B of FIG. 23 or C of FIG. 23.

That is, if a resident app of the receiving device 30 is to use (to be able to use) the pointer position (pointer) of associated metadata by specification, as shown in B of FIG. 23, the title names (in this case, Shiki Masaoka and Masayuki Akiyama as role names) of characters of focus targets are displayed according to pointer positions described by fitting to the positions of characters.

If a resident app of the receiving device 30 is not to use (to be unable to use) the pointer position (pointer) of associated metadata by specification, as shown in C of FIG. 23, a list 131 of the title names (in this case, Shiki Masaoka and Masayuki Akiyama as role names) of characters of focus targets is displayed on the upper right corner of the screen.

When the user performs a selection operation of the title name (in this case, Shiki Masaoka or Masayuki Akiyama as the role name) of a character of the focus target in B or C of FIG. 23, as shown in D of FIG. 23, the video of the drama is reduced to display an explanation of the selected character of the focus target.

D of FIG. 23 corresponds to a case when the title name (Shiki Masaoka as the role name) of the character of the focus target is selected. That is, the video of the drama program is reduced and a plurality of tabs whose title names are "Shiki Masaoka", "Teruyuki Kayama (name of the actor who acts as Shiki Masaoka)", and "Collection of haiku by Shiki" and an explanation 141 of the selected tab are displayed below the reduced video based on explanatory information (explanation) of the associated metadata.

A hyperlink 142 to "Study of Shiki Masaoka" and a hyperlink 143 to "Room of Teruyuki Kayama" are displayed based on @title of the link information (link) of the associated metadata above on the left of the video of the drama program as a reduced display. When the user selects the hyperlink 142 or the hyperlink 143, the browser is activated and connected to the link destination indicated by @url of the link information to display the web page of "Study of Shiki Masaoka" or "Room of Teruyuki Kayama".

Incidentally, the program progress synchronization information service shown in FIG. 23 can be realized by, for example, a segment data sequence shown in FIG. 24.

By providing, as described above, a program progress synchronization information service using a segment data sequence, it becomes possible, for example, to display an explanation of a term appearing in economic news, to display an explanation on the background or circumstances of an event, or to provide related past news or link information of related information. In addition, for example, it is possible to display a more detailed explanation or the position on a map of a shop or goods presented in an information program or travel program or to guide a viewer to a home-shopping site where the viewer can purchase presented goods.

Further, for example, it is possible to display an inquiry about a performer of a drama program or variety show or a correlation diagram of characters in a drama or to display an explanation about a scene. In addition, complementary scenes of a drama program or content such as NG scenes may be prepared and linked to a link destination.

Though a display example of the screen is omitted, for example, a character such as a person, animal, robot, or imaginary creature may be superimposed on a program video to use the keyword of associated metadata for utterance of the character.

However, FIGS. 17 to 21 and 23 show screen displays by way of example and how to use a segment data sequence depends on a resident app of the receiving device 30 or the information terminal 40. That is, the broadcasting side only provides a segment data sequence that can be used for a program progress synchronization information service to the receiving side and does not intend to limit how to display a segment data sequence.

The broadcasting side can put together various kinds of information synchronized with the progress of a television program in a segment data sequence as associated metadata by work similar to, for example, conventional creation of subtitle information synchronized with the program.

The above-described series of processing may be performed by hardware or may be performed by software. When the series of processing is performed by software, a program forming the software is installed into a computer that is incorporated in a dedicated hardware, or installed from a program storage medium into a general-purpose personal computer, for example, that can perform various types of functions by installing various types of programs.

FIG. 25 is a block diagram showing a hardware configuration example of a computer that performs the above-described series of processing using a program.

In the computer 200, a central processing unit (CPU) 201, a read only memory (ROM) 202 and a random access memory (RAM) 203 are mutually connected by a bus 204.

Further, an input/output interface 205 is connected to the bus 204. Connected to the input/output interface 205 are an input unit 206 formed by a keyboard, a mouse, a microphone and the like, an output unit 207 formed by a display, a speaker and the like, a storage unit 208 formed by a hard disk, a nonvolatile memory and the like, a communication unit 209 formed by a network interface and the like, and a drive 210 that drives a removable media 211 that is a magnetic disk, an optical disk, a magneto-optical disk, or a semiconductor memory etc.

In the computer configured as described above, the CPU 201 loads a program that is stored, for example, in the storage unit 208 onto the RAM 203 via the input/output interface 205 and the bus 204, and executes the program. Thus, the above-described series of processing is performed.

Note that the program executed by the computer may be a program in which processes are carried out in a time series in the order described in this specification or may be a program in which processes are carried out in parallel or at necessary timing, such as when the processes are called.

In addition, the program may be to be processed by one computer or by a plurality of computers in a distributed manner. Further, the program may be to be transferred to a remote computer for execution.

A system in the specification represents a whole device constituted of a plurality of devices.

Incidentally, the embodiment of the present disclosure is not limited to the above embodiment and various modifications may be made without departing from the spirit and scope of the present disclosure.

REFERENCE SIGNS LIST

1: broadcasting network
2: internet
10: broadcasting system
20: broadcasting equipment
21: segment data sequence server
22: content server
30: receiving device
40: information terminal
61: tuner
62: demultiplexing unit
63: audio decoder
64: audio output unit
65: video decoder
66: analysis unit
67: video output unit
68: control unit
69: memory
70: operation unit
71: communication I/F
72: app engine
73: external I/F
81: reception monitoring unit
82: application control descriptor acquisition unit
83: application control descriptor analysis unit 84: application control data acquisition unit
85: segment data sequence holding unit
86: segment data analysis unit
100: computer
101: CPU

The invention claimed is:

1. A receiving device, comprising:
communication circuitry configured to:
receive video content broadcast from a broadcast source via a broadcasting network; and
receive a segment data sequence, from a feeding source via a network different than the broadcasting network, that includes segment data, the segment data including a segment validity period which indicates a synchronization period with the video content and identifies metadata associated with the video content, the segment validity period of the segment data is indicated by a presentation timestamp (PTS), the PTS indicating a progress position of the video content, the metadata sets a focus target in the video content and the metadata includes a focus type of the set focus target and a position of the set focus target on a screen when the video content is displayed, and the set focus target is an element in the video content for which at least one information is to be displayed; and
processing circuitry configured to:
execute an application program that processes the metadata during the segment validity period included in the segment data;
control, according to the execution of the application program, the communication circuitry to transmit information of the set focus target to an information terminal;
control a display to display the video content according to the acquired segment data sequence; and
determine, according to the PTS, whether a progress timing of the video content is within the segment validity period, wherein
the processing circuitry continues to execute the application program while the progress timing of the video content is within the segment validity period, and
the processing circuitry terminates execution of the application program when the processing circuitry determines, according to the PTS, that the progress timing of the video content is past the segment validity period.

2. The receiving device according to claim 1, wherein
the communication circuitry is configured to receive an application control descriptor containing a uniform resource identifier (URL) of the feeding source, and
the processing circuitry is configured to control the communication circuitry to request feeding of the segment data sequence from the feeding source via the network based on the application control descriptor.

3. A receiving method, comprising:
receiving, by circuitry of a receiving device, video content broadcast from a broadcast source via a broadcasting network;
acquiring, by the circuitry, a segment data sequence from a feeding source via a network different than the broadcasting network, that includes segment data, the segment data including a segment validity period which indicates a synchronization period with the video content and identifies metadata associated with the video content, the segment validity period of the segment data is indicated by a presentation timestamp (PTS), the PTS indicating a progress position of the video content, the metadata sets a focus target in the video content and the metadata includes a focus type of the set focus target and a position of the set focus target on a screen when the video content is displayed, and the set focus target is an element in the video content for which at least one information is to be displayed;
executing, by the circuitry, an application program that processes the metadata during the segment validity period included in the segment data;
transmitting, according to the execution of the application program, information of the set focus target to an information terminal;
controlling a display to display the video content concurrent according to the acquired segment data sequence; and
determining, by the circuitry and according to the PTS, whether a progress timing of the video content is within the segment validity period, wherein
the application program continues to be executed while the progress timing of the video content is within the segment validity period, and
the application program is terminated when the circuitry determines, according to the PTS, that the progress timing of the video content is prior to or past the segment validity period.

4. A non-transitory computer-readable medium storing a set of computer-executable instructions which, when executed by circuitry of a receiving device, causes the circuitry to perform a method comprising:
receiving video content broadcast from a broadcast source via a broadcasting network;
acquiring a segment data sequence from a feeding source via a network different than the broadcasting network, that includes segment data, the segment data including a segment validity period which indicates a synchronization period with the video content and identifies metadata associated with the video content, the segment validity period of the segment data is indicated by a presentation timestamp (PTS), the PTS indicating a progress position of the video content, the metadata sets a focus target in the video content and the metadata includes a focus type of the set focus target and a position of the set focus target on a screen when the video content is displayed, and the set focus target is an element in the video content for which at least one information is to be displayed;
automatically providing the metadata to an application program, which is executed by the computer, for processing during the segment validity period included in the segment data;
executing the application program that processes the metadata during the segment validity period;
transmitting, according to the execution of the application program, information of the set focus target to an information terminal;
controlling a display to display the video content concurrent according to the acquired segment data sequence; and
determining, according to the PTS, whether a progress timing of the video content is within the segment validity period, wherein
the application program continues to be executed while the progress timing of the video content is within the segment validity period, and the application program is terminated when the circuitry determines, according to the PTS, that the progress timing of the video content is prior to or past the segment validity period.

5. The receiving device according to claim 1, wherein the processing circuitry is configured to:
provide a notification of a presence of the metadata by controlling display of a logo, and
hold image data of the logo in advance.

6. The receiving device according to claim 5, wherein the processing circuitry is configured to control display of the logo corresponding to the focus type of the set focus target.

7. The receiving device according to claim 1, wherein the communication circuitry is further configured to transmit a request, to the feeding source, for the segment data sequence.

8. The receiving device according to claim 7, wherein the receiving device receives, from the feeding source, the segment data sequence in response to the request.

9. The receiving device according to claim 1, wherein the at least one information about the focus target includes at least one of a title name, explanatory information, link information, a keyword, and latitude and longitude information about the focus target.

10. The receiving device according to claim 2, wherein the communication circuitry is configured to receive the application control descriptor in a service description table (SOT) or in an event information table (EIT) contained in a digital broadcasting signal.

11. The receiving method according to claim 3, further comprising:
receiving an application control descriptor containing a uniform resource identifier (URL) of the feeding source; and
requesting feeding of the segment data sequence from the feeding source via the network based on the application control descriptor.

12. The receiving method according to claim 3, further comprising:
providing a notification of a presence of the metadata by displaying a logo; and
holding image data of the logo in advance.

13. The receiving method according to claim 12, further comprising displaying the logo corresponding to the focus types of the set focus target.

14. The receiving method according to claim 3, further comprising transmitting a request, to the feeding source, for the segment data sequence.

15. The receiving method according to claim 14, wherein the receiving device receives, from the feeding source, the segment data sequence in response to the request.

16. The receiving method according to claim 3,
wherein the at least one information about the focus target includes at least one of a title name, explanatory information, link information, a keyword, and latitude and longitude information about the focus target.

17. The receiving method according to claim 3, further comprising receiving the application control descriptor in a service description table (SOT) or in an event information table (EIT) contained in a digital broadcasting signal.

18. A digital television, comprising:
the device according to claim 1; and
the display.

* * * * *